(12) United States Patent
Vitse et al.

(10) Patent No.: US 7,494,634 B2
(45) Date of Patent: Feb. 24, 2009

(54) REDUCTION OF NITROGEN OXIDES USING MULTIPLE SPLIT STREAMS

(75) Inventors: Frederic Vitse, Schenectady, NY (US); Dan Hancu, Clifton Park, NY (US); Benjamin Hale Winkler, Albany, NY (US)

(73) Assignee: General Electric Company, Niskayuna, NY (US)

( * ) Notice: Subject to any disclaimer, the term of this patent is extended or adjusted under 35 U.S.C. 154(b) by 226 days.

(21) Appl. No.: 11/651,710

(22) Filed: Jan. 10, 2007

(65) Prior Publication Data

US 2008/0166283 A1    Jul. 10, 2008

(51) Int. Cl.
*B01D 53/54*    (2006.01)
*B01D 53/56*    (2006.01)
*B01D 53/74*    (2006.01)
*B01D 53/75*    (2006.01)
*B01D 53/86*    (2006.01)
*B01D 53/94*    (2006.01)
*F01N 3/10*    (2006.01)
*F01N 3/18*    (2006.01)
*F01N 3/20*    (2006.01)

(52) U.S. Cl. .............. 423/213.2; 423/213.5; 423/213.7; 423/235; 423/236; 423/237; 423/239.1; 422/168; 422/169; 422/170; 422/171; 422/172; 422/177; 422/180; 422/181; 60/274; 60/282; 60/299; 60/301; 60/324

(58) Field of Classification Search .............. 423/213.2, 423/213.5, 213.7, 235, 236, 237, 239.1; 422/168–172, 422/177, 180, 181; 60/274, 282, 299, 301, 60/324
See application file for complete search history.

(56) References Cited

U.S. PATENT DOCUMENTS

| 5,863,508 | A | 1/1999 | Lachman et al. ............. 422/171 |
| 6,835,689 | B1 | 12/2004 | He et al. ..................... 502/302 |
| 2005/0002843 | A1 | 1/2005 | Kim et al. ................ 423/239.1 |
| 2008/0102010 | A1 * | 5/2008 | Bruck et al. ............. 423/213.2 |

FOREIGN PATENT DOCUMENTS

EP         1422395 B1    6/2006

* cited by examiner

*Primary Examiner*—Timothy C Vanoy
(74) *Attorney, Agent, or Firm*—Richard A. DeCristofaro

(57) ABSTRACT

Systems and methods of removing at least nitrogen oxides from an exhaust fluid generally include dividing a flow of an exhaust fluid comprising a concentration of nitric oxide into three types of flow-through cells. The first flow-through cell comprises a catalyst configured to reduce the nitric oxide with a reductant to form a first feedstream comprising nitrogen containing species derived therefrom. The second flow-through cell comprises a catalyst configured to oxidize nitric oxide to form a second feedstream comprising nitrogen dioxide. The third flow-through cell does not change the nitric oxide concentration and form a third feedstream comprising nitric oxide. After flowing through the three different types of cells, the feedstreams are mixed to form a homogenous mixture and then fed to a catalyst bed configured to convert the nitrogen containing species, the nitric oxide, and the nitrogen dioxide to a fluid comprising nitrogen gas and water.

22 Claims, 2 Drawing Sheets

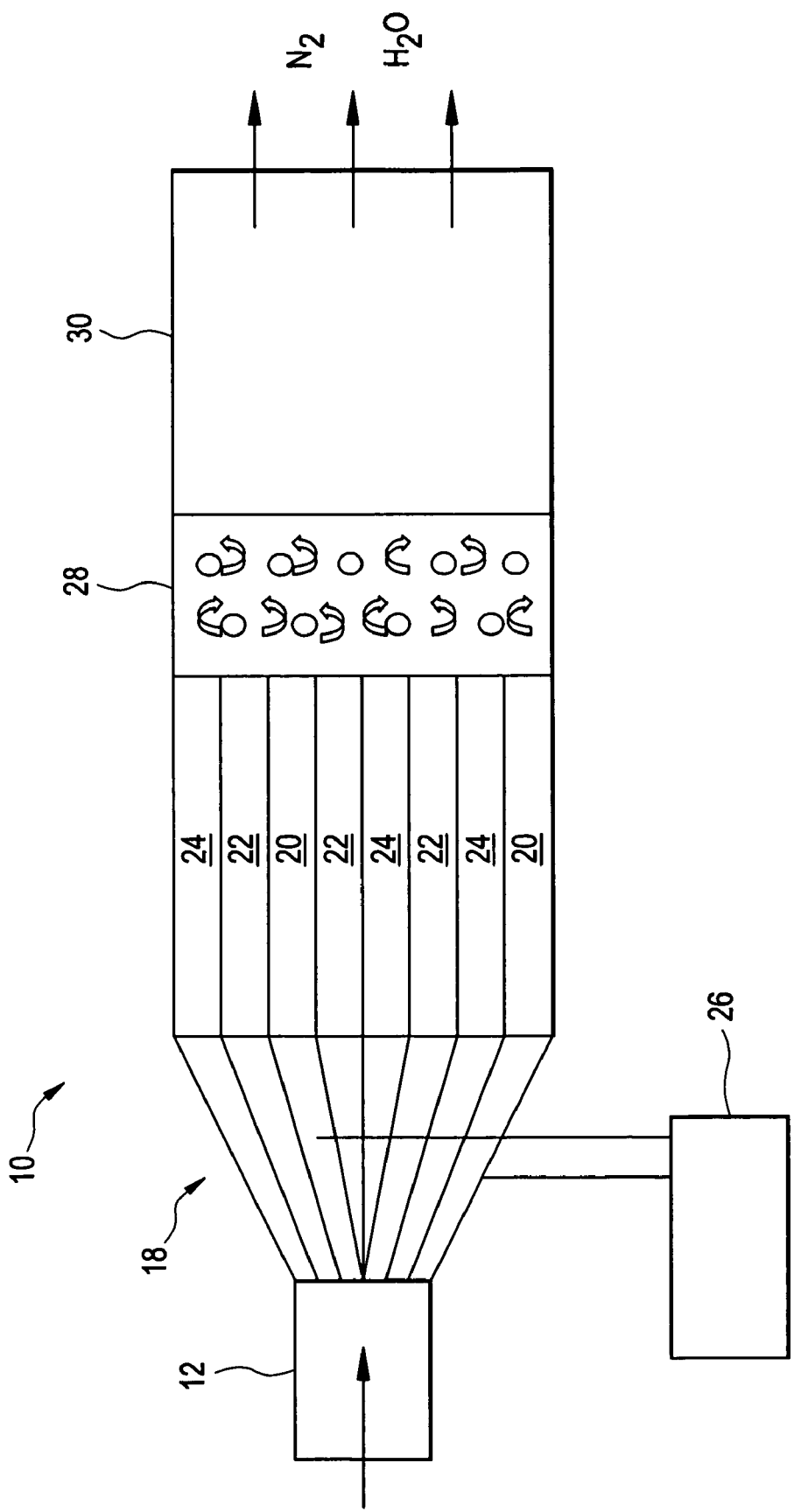

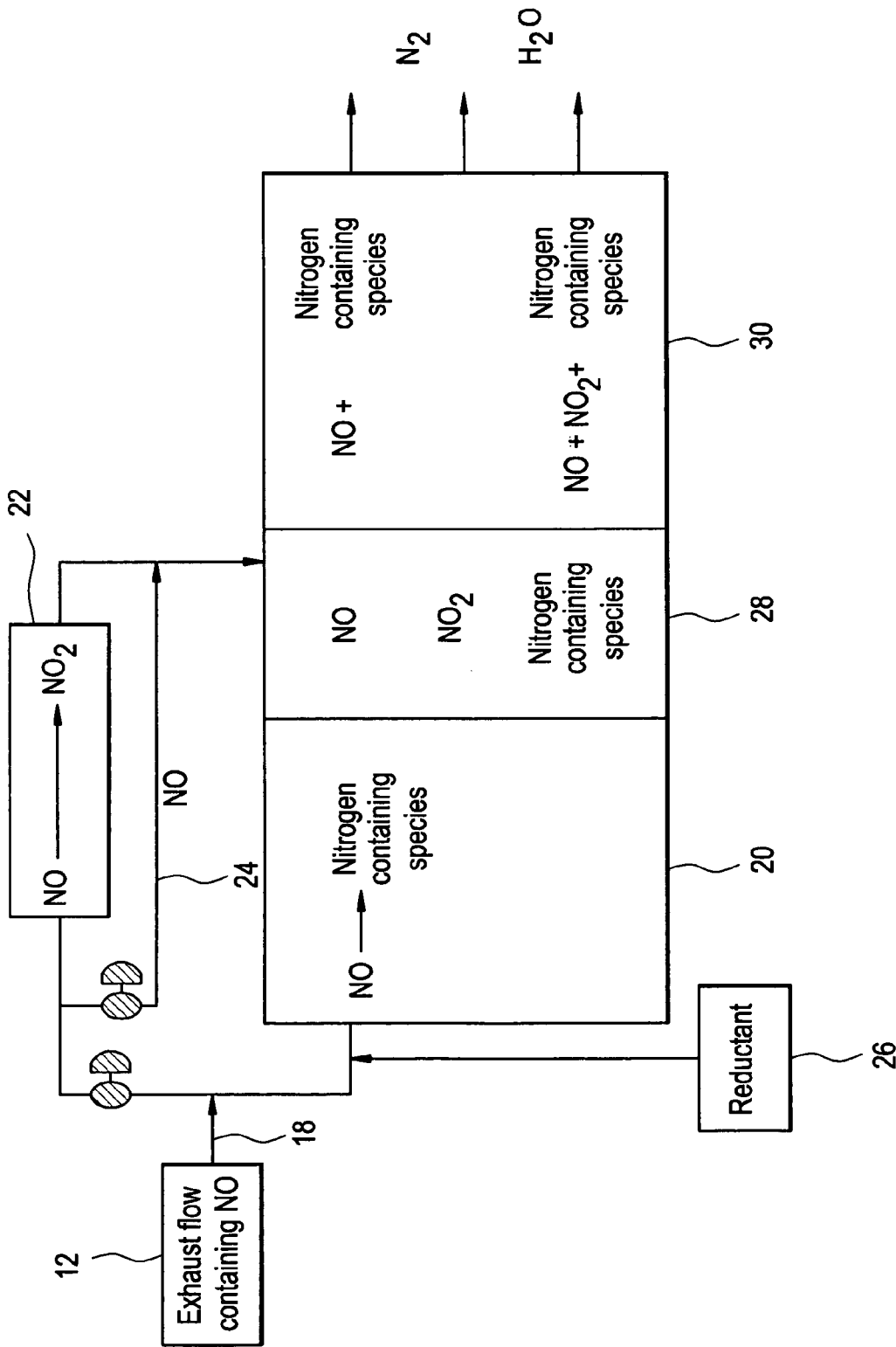

REDUCTION OF NITROGEN OXIDES USING MULTIPLE SPLIT STREAMS

BACKGROUND

The present disclosure generally relates to systems and methods for reducing nitrogen oxides ($NO_x$) emissions, and more particularly, to systems and methods that split an exhaust stream to produce various feedstreams that are then recombined and fed to a selective catalytic reaction bed.

An internal combustion engine, for example, transforms fuel such as gasoline, diesel, and the like, into work or motive power through combustion reactions. These reactions produce byproducts such as carbon monoxide (CO), unburned hydrocarbons (UHC), and nitrogen oxides ($NO_x$) (e.g., nitric oxide (NO) and nitrogen dioxide ($NO_2$)). Air pollution concerns worldwide have led to stricter emissions standards for engine systems. As such, research is continually being conducted into systems and methods for reducing at least the nitrogen oxides emissions.

One method of removing nitrogen oxides from an exhaust fluid involves a selective catalytic reduction (SCR) process in which nitrogen oxides are reduced. For example, an ammonia-SCR process is widely used, wherein ammonia is used as a reducing agent in the selective catalytic reduction process to produce nitrogen gas and water. Ammonia-SCR, also referred to as $NH_3$-SCR, is commonly used because of its catalytic reactivity and selectivity. However, practical use of ammonia has been largely limited to power plants and other stationary applications. More specifically, the toxicity and handling problems (e.g., storage tanks) associated with ammonia has made use of the technology in automobiles and other mobile engines impractical. For example, current regulations with regard to ammonia slip in vehicle exhaust systems are oftentimes difficult to meet.

The selective catalytic reduction of nitrogen oxides with hydrocarbons (HC-SCR) has also been exhaustively studied in recent years as a potential competitor to the $NH_3$-SCR process. The hydrocarbon reductant reacts with the nitrogen oxides in the exhaust stream to form primarily nitrogen gas and carbon dioxide. The main advantage of this selective catalytic reduction process is the use of hydrocarbons as the reducing species as opposed to ammonia, which has minimal concerns with regard to slippage. For example, an HC-SCR process using propane as the reducing agent is known. However, the process has not been commercialized yet because of its low removal activity of nitrogen oxides. In addition, the catalysts used in the HC-SCR process generally present a narrow operating temperature range. As such, these types of beds are impractical in processing exhaust fluid streams generated from fuels in transient applications where the catalyst material is subjected to a broad range of temperatures.

Accordingly, a continual need exists for improved systems and methods for reducing nitrogen oxide emissions.

BRIEF SUMMARY

Disclosed herein are methods and exhaust conduits configured to reduce nitrogen oxide emissions. In one embodiment, a method of reducing nitrogen oxides from an exhaust fluid comprises dividing a flow of an exhaust fluid comprising a concentration of nitric oxide into three types of flow-through cells, wherein the first flow-through cell comprises a catalyst configured to reduce the nitric oxide with a reductant to form a first feedstream comprising nitrogen containing species. The second flow-through cell comprises a catalyst configured to oxidize nitric oxide to form a second feedstream comprising nitrogen dioxide, and the third flow-through cell does not change the nitric oxide concentration and forms a third feedstream comprising nitric oxide. The first, second, and third feedstreams are then mixed to form a homogenous mixture; and fed into a catalyst bed configured to convert the nitrogen containing species, nitric oxide, and nitrogen dioxide to a fluid comprising nitrogen gas and water.

An exhaust conduit for reducing nitrogen oxides emission comprises a first portion comprising at least three cells, the at least three cells comprising a first cell configured to reduce nitric oxide to form nitrogen containing species; a second cell configured to oxidize nitric acid to form nitrogen dioxide; and a third cell configured not to be non-reactive with nitric oxide fluid; and a hydrocarbon reductant disposed upstream from and in fluid communication with the first cell; a second portion downstream from and in fluid communication with the first portion and configured to form a homogenous mixture of the nitrogen containing species, nitric oxide, and nitrogen dioxide from the first portion; and a third portion downstream from and in fluid communication with the second portion, the third portion configured to react the nitrogen containing species, nitric oxide, and nitrogen dioxide to form a fluid comprising nitrogen gas and water.

The above described and other features are exemplified by the following Figures and detailed description.

BRIEF DESCRIPTION OF THE DRAWINGS

Referring to the exemplary drawings wherein like elements are numbered alike in the several Figures:

FIG. 1 is a schematic illustration of an embodiment of a system for reducing at least nitrogen oxides emissions; and FIG. 2 is a schematic illustration of another embodiment of a system for reducing at least nitrogen oxides emissions.

DETAILED DESCRIPTION

Disclosed herein are systems and methods for reducing the emission of nitrogen oxides (NOx) including, but not limited to, NO, $NO_2$, and the like. To efficiently reduce nitrogen oxides from a fluid stream with minimal reductant, the exhaust flow at the outlet of a diesel/lean engine burn is split into multiple flow paths defined by three different types of flow-through cells. A first portion of the NOx containing exhaust gas flows through a first flow-through cell containing a catalytic bed optimized for hydrocarbon selective catalytic reduction to produce nitrogen containing species. As used herein, the term "nitrogen containing species" is intended to include, but is not limited to, alkyl nitrates, nitrous oxide, hydrogen cyanide, dimethylamine, ammonia, methylamine, trimethylamine, ethylamine, acetonitrile and various other derivatives of NO. The nitrogen containing species are partially reduced derivatives of NO and have been found to be highly reactive with the NO and $NO_2$ contained in the other split steams upon mixture therewith and subsequent contact with an additional catalyst bed positioned downstream of the multiple flow paths. It should be noted that the type of alkyl group can vary in the nitrogen containing species and will generally depend on the hydrocarbon reductant. In one embodiment, the reductant (e.g., one or more of $H_2$, CO, and $C_1$ to $C_{13}$ species) is generated on board such as may occur in reformers of diesel engine systems, wherein the alkyl group can vary with the average molecular weight of the reductant for these on-board systems of about $C_6$-$C_7$. To form the nitrogen containing species, the one or more hydrocarbon reductants are fed into the cell upstream from the catalytic bed. Optionally, hydrogen gas can be added as a co-reductant. By use of the hydrocarbon reductant and the hydrogen gas as an optional co-reductant, the catalytic reaction of NO favors the formation of these partially-reduced nitrogenated compounds, which become the active reductant in a catalytic bed downstream of the multiple split streams. In other embodiments, the reductant is not generated on board and is injected prior to the catalytic bed.

A second portion of the nitrogen oxide containing exhaust gas feedstream is fed to a second flow-through cell containing a catalyst optimized for oxidizing the nitric oxides (NO) present in the exhaust gas stream to nitrogen oxide ($NO_2$).

A third portion of the exhaust gas flows through a flow-through cell that is non reactive with NO such that the NO concentration in the exhaust gas remains unchanged.

The different portions flowing though the three types of cells are then combined and fed to a catalytic reactor to form nitrogen gas and water. It has been found that the various nitrogen containing species formed during the hydrocarbon selective catalytic reduction are highly reactive with NO and $NO_2$ from the other feedstreams and effectively lowers the activation energy necessary to catalytically form nitrogen gas and water. In a preferred embodiment, the ratio of nitrogen containing species to NO to $NO_2$ that is subsequently recombined is at about 2:1:1, respectively. As a result of splitting the exhaust gas stream in this manner and subsequent recombination of the split streams, lower amounts of reductant are used in the system since only a portion of the exhaust stream is treated. The lower amount of reductants for reducing NOx in the exhaust fluid represents a significant commercial advantage.

FIG. 1 illustrates a cross section of an exemplary reactor configured for first splitting the exhaust gas feedstream by feeding the exhaust gas into three types of cells, then recombining and mixing the various feedstreams, which are subsequently fed to a catalytic reactor to generate nitrogen and water. FIG. 2 schematically illustrates the process flow for splitting the exhaust gas feedstream as discussed above. While not wanting to be bound by theory, the reaction scheme can be presented by equation (1) below.

$$4NH_3 + 2NO + 2NO_2 \rightarrow 4N_2 + 6H_2O \quad (I)$$

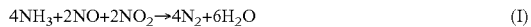

In the various descriptions herein, an "upstream" direction refers to the direction from which the local flow is coming, while a "downstream" direction refers to the direction in which the local flow is traveling. In the most general sense, flow through the system tends to be from front to back, so the "upstream direction" will generally refer to a forward direction, while a "downstream direction" will refer to a rearward direction. The terms reducing agent and reductant are used interchangeably throughout this disclosure and are generally selected for the particular desired reaction and catalyst bed.

Referring to FIG. 1, system 10 comprises an exhaust fluid source 12 in fluid communication with an exhaust conduit 18. Disposed within the exhaust conduit 18 is a plurality of flow-through cells 20, 22, 24. It should be noted that the arrangement, numbers and/or shapes of the cells are not intended to be limited. For example, the cells can be in the form of a honeycomb body, wherein selected passageways are coated with a catalyst and -installed in the exhaust conduit as described above.

Cell 20 is configured for partially reducing NO to nitrogen containing species as discussed above, cell 22 is configured for converting NO to $NO_2$, and cell 24 is substantially non-reactive to NO. A reductant source 26 is provided in fluid communication with cell 20. As previously noted, the reductant source 26 can be generated on-board or stored separately. Located downstream from the cells 20, 22, 24 is a mixing zone 28, wherein the split feedstreams flowing through cells 20, 22, and 24 are combined and mixed. The mixing zone 28 may include various baffles and the like for providing a homogenous mixture of the fluids exiting the various cells as will be appreciated by those in the art. The homogenous mixture is then fed further downstream to a catalyst bed 30 configured for converting $NO+NO_2$+nitrogen containing species to nitrogen gas and water in the manner shown in equation (1). Advantageously, it has unexpectedly been discovered that nitrogen containing species, including, among others, various alkyl nitrates, are highly reactive with NO and $NO_2$ to produce nitrogen and water.

The exhaust fluid source 12 includes any source of an exhaust fluid that comprises nitrogen oxides ($NO_X$). By way of example, the exhaust fluid source 12 can include, but is not limited to, exhaust fluids from spark ignition engines and compression ignition engines. While spark ignition engines are commonly referred to as gasoline engines and compression ignition engines are commonly referred to as diesel engines, it is to be understood that various other types of fuels can be employed in the respective internal combustion engines. Examples of the fuels include hydrocarbon fuels such as gasoline, diesel, ethanol, methanol, kerosene, and the like; gaseous fuels, such as natural gas, propane, butane, and the like; and alternative fuels, such as hydrogen, biofuels, dimethyl ether, and the like; as well as combinations comprising at least one of the foregoing fuels. The exhaust fluid is generally at a temperature of about 150° C. to about 600° C. and the concentration of nitrogen oxides in the exhaust fluid is reduced by the methods of the present disclosure.

As shown, the exhaust fluid source 12 is disposed upstream of and in fluid communication with cells 20, 22, and 24. Based on experimental data, it is desired that about 30 to about 60% by total volume of the exhaust feedstream flow-through cell 20, with about 40 to about 60% by total volume preferred in other embodiments. In one embodiment, about 50 percent of the exhaust feedstream flows through cells 20. Desirably, the portions of the exhaust feedstream flowing through cells 20, 22, and 24 should be effective to provide a ratio of about 2:1:1 of the converted nitrogen containing species, the unconverted NO, and the converted $NO_2$ in the mixing zone 28. By providing this ratio of components in the exhaust gas to the mixing zone, improved selectivity and conversion is observed. Moreover, about a 50% reduction or more of reductant utilization is advantageously observed since the reductant is employed for conversion of the NO to nitrogen containing species.

Cell 20 comprises a selective catalyst reduction bed optimized for a HC-SCR process, (hereinafter referred to as the HC-SCR bed). The HC-SCR bed generally includes a first active catalyst material and a second active catalyst material, wherein the first active catalyst material generally comprises silver metal or its oxide, and the second active catalyst material is selected such that its sulfide is active toward $NO_X$ selective catalytic reduction. Suitable second catalyst materials include, but are not limited to, gallium (Ga), indium (In), tin (Sn), gold (Au), cobalt (Co), nickel (Ni), zinc (Zn), copper (Cu), platinum (Pt), and palladium (Pd), as well as oxides and alloys comprising at least one of the foregoing. The catalyst may be arranged as a packed or fluidized bed reactor, coated on a monolithic or membrane structure, or arranged in any other manner within the exhaust system such that the catalyst is in contact with the effluent gas. In one embodiment, the HC-SCR bed 20 comprises a combination of silver and gallium.

In addition to the first and second active catalyst materials, the HC-SCR bed 20 may comprise a substrate and an optional support material, which is sometimes referred as a washcoat layer. The first and second active catalyst material can be disposed directly on a surface of the substrate and/or can be disposed on the optional support material, which in turn can be disposed on a surface of the substrate. The first and the second active catalyst material, as well as the optional support material, can be disposed on the substrate by any suitable method known in the art (e.g., a wash-coating method).

The substrate of the HC-SCR bed 20 is selected to be compatible with the operating environment (e.g., exhaust gas temperatures). Suitable substrate materials include, but are not limited to, cordierite, nitrides, carbides, borides, and intermetallics, mullite, alumina, zeolites, lithium aluminosilicate, titania, feldspars, quartz, fused or amorphous silica, clays, aluminates, titanates such as aluminum titanate, silicates, zirconia, spinels, as well as combinations comprising at least one of the foregoing materials.

The optional support material is selected to be compatible with the operating environment and the active catalyst materials. Suitable support materials include, but are not limited to, inorganic oxides. Exemplary inorganic oxides include, but are not limited to, alumina ($Al_2O_3$), silica ($SiO_2$), zirconia ($ZrO_2$), titania ($TiO_2$), and combinations comprising at least one of the foregoing.

The reductant source 26 is in fluid communication with the HC-SCR bed 20 such that during operation a hydrocarbon reducing agent can be introduced upstream into the HC-SCR bed 20. While the choice of the reducing agent varies depending on the catalyst materials employed in the HC-SCR bed 20, suitable reducing agents include, but are not limited to, hydrocarbons, alcohols, and combinations comprising at least one of the foregoing. Exemplary alcohols include, but are not limited to, methanol, ethanol, n-butyl alcohol, 2-butanol, tertiary butyl alcohol, n-propyl alcohol, isopropyl alcohol, and combinations comprising at least one of the foregoing. Exemplary hydrocarbons include, among others, olefins such as ethylene, gasoline, various diesel blends, and paraffins such as propane. Preferably, the hydrocarbons are aliphatic hydrocarbons having one to thirteen carbons. If the reductants are produced on board, the average molecular weight in one embodiment is about $C_6$ to $C_7$.

In various embodiments, depending on whether the system is for mobile or stationary applications, the reductant can be produced on-board from available fuel or in the case of diesel engines, the reductants are readily available. In one embodiment, hydrogen gas is advantageously produced on board the system 10 by catalytically converting a fuel, such as those discussed above in relation to the internal combustion engine, into smaller molecules, namely hydrogen and carbon monoxide. In operation, the fuel can be converted to a gas comprising hydrogen, carbon monoxide, and hydrocarbons using steam reforming, auto-thermal reforming, partial-oxidation, or other known processes.

One advantage of embodiments of the present disclosure is that the reduction reaction in the HC-SCR bed may take place in "lean" conditions. That is, the amount of reductant added to the exhaust gas to reduce the $NO_x$ to nitrogen containing species is generally low (i.e., $O_2$ is present in large quantities and in stoichiometric excess compared to the reductant). Moreover, because only a portion of the exhaust stream 12 flows through the HC-SCR bed 20, even lower reductant amounts are needed than prior art systems where the entire exhaust stream flows through the HC-SCR bed. The molar ratio of reductant to $NO_x$ is typically from about 0.25:1 to about 3:1. More specifically, the ratio is typically such that the ratio of carbon atoms in the reductant is about 1 to about 24 moles per one mole of $NO_x$. The reduction reaction may take place over a range of temperatures. Typically, the temperature may range from about 300 to about 600° C., more typically about 350 to about 450° C. The optional co-reductant (i.e., hydrogen gas) can also disposed in fluid communication with the HC-SCR bed 20 such that during operation the co-reductant is introduced upstream along with the hydrocarbon agent. Advantageously, the use of the hydrogen gas in this manner allows the HC-SCR bed 20 to operate over an even wider temperature range (e.g., about 150 to about 600° C.) when compared to systems where hydrogen is not employed as a co-reductant. Moreover, the use of hydrogen gas as a co-reductant permits the use of lower amounts of the hydrocarbon reductant. Still further, the use of the hydrogen gas as a co-reductant advantageously minimizes the effect of sulfur dioxide deactivation of the catalyst materials of at least the HC-SCR bed 20.

Cell 22 is configured to catalytically oxidize NO in the exhaust stream to form $NO_2$. Cell 22 is inclusive of an active catalytic material, a substrate material, and an optional support material. The substrate material is selected to be compatible with the operating environment (e.g., exhaust gas temperatures). Suitable substrate materials include, but are not limited to, those materials discussed above in relation to the HC-SCR bed discussed above. Suitable active catalytic material/support materials include, but are not limited to, noble metal and metal oxides. Exemplary noble metals include combinations of rhodium (Rh) and platinum (Pt). Exemplary metal oxides include, but are not limited to, aluminum oxide ($Al_2O_3$), zinc oxide (ZnO), and titanium oxide ($TiO_2$).

As previously discussed, after mixing the various feedstreams from cells 20, 22, and 24 in the mixing zone 28, the feedstream mixture is then fed to a catalytic bed 30 for converting NO, $NO_2$ and RONOs to nitrogen gas and water. Various catalysts are suitable. In one embodiment, the catalytic bed is configured for an ammonia selective catalytic reduction process (also referred to herein as the "$NH_3$-SCR bed"). The $NH_3$-SCR bed 30 is disposed downstream of and in fluid communication with the mixing zone 28. By use of the term "ammonia or $NH_3$", it is meant to include reductant formed from nitrogenous compounds such as nitrogen hydrides, e.g. ammonia or hydrazine, or an ammonia precursor. The ammonia can be in anhydrous form or as an aqueous solution, for example. By "ammonia precursors" we mean one or more compounds from which ammonia can be derived, e.g. by hydrolysis. These include urea ($CO(NH_2)_2$) as an aqueous solution or as a solid or ammonium carbamate ($NH_2COONH_4$).

The catalysts employed in the $NH_3$-SCR bed 30 vary depending, for example, on the exhaust temperatures of the exhaust fluid as well as the choice of ammonia reducing agents employed in the system 10. By way of example, in the case of a bed containing a vanadium catalyst material, a lower content of the vanadium catalyst may be preferred in some embodiments since as the temperature of the exhaust fluid stream increases, the oxidation of by products in the exhaust stream back to NOx is enhanced.

Suitable active catalyst materials for the $NH_3$-SCR bed 16 include, but are not limited to, indium (In), copper (Cu), silver (Ag), zinc (Zn), cadmium (Cd), cobalt (Co), nickel (Ni), iron (Fe), molybdenum (Mo), tungsten (W), titanium (Ti), vanadium (V), and zirconium (Zr), as well as oxides and alloys comprising at least one of the foregoing. The $NH_3$-SCR bed 16 may include a substrate, and an optional support material onto which the catalyst materials are deposited.

The substrate materials suitable for use in the $NH_3$-SCR bed include, but are not limited to, those materials discussed above in relation to the other beds utilized in cells 20, 22. Suitable materials for the optional support material also include, but are not limited to, those materials discussed above in relation to the other beds 20, 22. In one embodiment, the support material comprises a zeolite. Suitable zeolites include, but are not limited to, mordenites, pentasil structure zeolites such as ZSM type zeolites, in particular ZSM-5 zeolites, and faujasites (Y-type family).

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of reducing nitrogen oxides from an exhaust fluid, the method comprising:
    dividing a flow of an exhaust fluid comprising a concentration of nitric oxide into three types of flow-through cells, wherein the first flow-through cell comprises a catalyst configured to reduce the nitric oxide with a reductant to form a first feedstream comprising nitrogen containing species, the second flow-through cell comprises a catalyst configured to oxidize nitric oxide to form a second feedstream comprising nitrogen dioxide, and the third flow-through cell does not change the nitric oxide concentration and forms a third feedstream comprising nitric oxide;
    mixing the first, second, and third feedstreams to form a homogenous mixture; and
    flowing the mixture into a catalyst bed configured to convert the nitrogen containing species, nitric oxide, and nitrogen dioxide to produce a treated exhaust fluid comprising nitrogen gas and water.

2. The method of claim 1, wherein the reductant is fed upstream and into the first flow-through cell.

3. The method of claim 1, wherein the first flow-through cell comprises a catalyst material selected from the group consisting of silver, gallium, indium, tin, gold, cobalt, nickel, zinc, copper, platinum, palladium, and oxides and alloys comprising at least one of the foregoing.

4. The method of claim 3, wherein the catalyst material further comprises an inorganic oxide support material selected from the group consisting of alumina, silica, zirconia, titania, and combinations comprising at least one of the foregoing.

5. The method of claim 1, wherein the reductant is a hydrocarbon reductant.

6. The method of claim 5, further comprising introducing a co-reductant with the reductant, wherein the co-reductant is hydrogen gas.

7. The method of claim 5, wherein the hydrocarbon reductant comprises a mixture comprising aliphatic hydrocarbons, aliphatic alcohols, hydrogen gas, or mixtures thereof.

8. The method of claim 1, wherein the exhaust fluid comprising a concentration of nitrogen oxides is at a temperature of about 150° C. to about 600° C. and the concentration of nitrogen oxides in the exhaust fluid is reduced.

9. The method of claim 1, wherein the first, second, and third flow-through cells are arranged in a honeycomb body.

10. The method of claim 1, wherein dividing the flow of the exhaust fluid into the three types of flow-through cells comprises simultaneously flowing the exhaust fluid through multiple cells of each type.

11. The method of claim 1, wherein the homogenous mixture comprises a 2:1:1 ratio of nitrogen containing species, nitric oxide, and nitrogen dioxide.

12. The method of claim 1, wherein the second flow-through cell comprises a catalyst material comprising a noble metal or a metal oxide.

13. The method of claim 1, further comprising injecting a nitrogen hydride reductant into the catalyst bed configured to convert the nitrogen containing species, nitric oxide, and nitrogen dioxide to produce the nitrogen gas and water, wherein the catalyst bed comprises a catalyst material selected from the group consisting of indium, copper, silver, zinc, cadmium, cobalt, nickel, iron, molybdenum, tungsten, titanium, vanadium, zirconium, and oxides and alloys comprising at least one of the foregoing.

14. The method of claim 13, wherein the nitrogen hydride is selected from the group consisting of ammonia and hydrazine.

15. The method of claim 1, wherein the nitrogen containing species derived from nitric oxide comprises alkyl nitrates of the general formulae $RONO$ and $RONO_2$, wherein R is an alkyl group; dimethylamine; hydrogen cyanide; ammonia; nitrous oxide; methyl amine; trimethylamine; ethylamine; acetonitrile, and mixtures thereof.

16. The method of claim 1, wherein dividing the flow of the exhaust fluid comprising a concentration of nitric oxide into the three types of flow-through cells comprises flowing about 40 to about 60 percent of the total volume of exhaust fluid through the first flow-through cell.

17. An exhaust conduit for removing at least nitrogen oxides from an exhaust gas, the exhaust conduit comprising:
    a first portion comprising at least three cells, the at least three cells comprising a first cell configured to reduce nitric oxide to nitrogen containing species; a second cell configured to oxidize nitric oxide to nitrogen dioxide; and a third cell configured to be non-reactive with nitric oxide; and wherein the first cell further comprises a reductant disposed upstream from and in fluid communication therewith;
    a second portion downstream from and in fluid communication with the first portion and configured to form a homogenous mixture of the nitrogen containing species, nitric oxide, and nitrogen dioxide from the first portion; and
    a third portion downstream from and in fluid communication with the second portion, the third portion configured to react the nitrogen containing species, nitric oxide, and nitrogen dioxide to form nitrogen gas and water.

18. The exhaust conduit of claim 17, wherein the first cell comprises a catalyst material selected from the group consisting of silver, gallium, indium, tin, gold, cobalt, nickel, zinc, copper, platinum, palladium, and oxides and alloys comprising at least one of the foregoing.

19. The exhaust conduit of claim 17, wherein the homogenous mixture comprises a 2:1:1 ratio of nitrogen containing species, nitric oxide, and nitrogen dioxide, respectively.

20. The exhaust conduit of claim 17, wherein the second cell comprises a catalyst material comprising a noble metal or a metal oxide.

21. The exhaust conduit of claim 17, wherein the third portion configured to react the nitrogen containing species, nitric oxide, and nitrogen dioxide to form nitrogen gas and water comprises an ammonia selective catalyst reduction bed and a nitrogen hydride reductant source in fluid communication therewith.

22. The exhaust conduit of claim 17, wherein the reductant comprises aliphatic hydrocarbons, aliphatic alcohols, hydrogen gas, or mixtures thereof.

* * * * *